(12) United States Patent
Itou (10) Patent No.: US 10,737,360 B2
(45) Date of Patent: Aug. 11, 2020

(54) ROTARY TABLE SYSTEM

(71) Applicant: FANUC CORPORATION, Yamanashi (JP)

(72) Inventor: Tomoya Itou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 15 days.

(21) Appl. No.: 16/110,468

(22) Filed: Aug. 23, 2018

(65) Prior Publication Data
US 2019/0070699 A1 Mar. 7, 2019

(30) Foreign Application Priority Data
Sep. 6, 2017 (JP) ................................. 2017-170967

(51) Int. Cl.
*B23Q 1/54* (2006.01)
*B23Q 1/52* (2006.01)
(Continued)

(52) U.S. Cl.
CPC ........... *B23Q 1/5437* (2013.01); *B23Q 1/525* (2013.01); *B23Q 16/10* (2013.01); *B23Q 16/105* (2013.01); *B23Q 17/00* (2013.01)

(58) Field of Classification Search
None
See application file for complete search history.

(56) References Cited

U.S. PATENT DOCUMENTS

2005/0139036 A1* 6/2005 Kato ..................... B23Q 1/287
74/813 L
2009/0283950 A1 11/2009 Bernhard et al.
(Continued)

FOREIGN PATENT DOCUMENTS

CN 104122018 A 10/2014
CN 105904282 A 8/2016
(Continued)

OTHER PUBLICATIONS

Office Action issued in JP 2017-170967; mailed by the Japanese Patent Office dated Jun. 25, 2019.
(Continued)

*Primary Examiner* — Brian D Keller
(74) *Attorney, Agent, or Firm* — Studebaker & Brackett PC (57) ABSTRACT

The rotary table system includes a first rotary table coupled to one end side of a member for loading a workpiece, a second rotary table coupled to an other end side, a motor that rotationally drives the member for loading a workpiece, a first clamping mechanism that can clamp the first rotary table, a second clamping mechanism that can clamp the second rotary table, a clamp torque measuring device, a first operating passage that sends a clamping operation instruction to the first clamping mechanism, and a second operating passage that sends a clamping operation instruction to the second clamping mechanism, in which the clamp torque measuring device measures clamp torque individually for each of the first, second clamping mechanisms by individually selecting the first, second operating passage and causing the first, second clamping mechanisms to individually perform a clamping operation.

4 Claims, 9 Drawing Sheets

(51) Int. Cl.
*B23Q 17/00* (2006.01)
*B23Q 16/10* (2006.01)

(56) References Cited

U.S. PATENT DOCUMENTS

| | | |
|---|---|---|
| 2010/0247262 A1 | 9/2010 | Sakane et al. |
| 2010/0262275 A1 | 10/2010 | Schoening et al. |
| 2014/0318271 A1* | 10/2014 | Tezuka .................... G01L 3/06 73/862.321 |
| 2016/0236309 A1* | 8/2016 | Chen ........................ B23Q 3/04 |

FOREIGN PATENT DOCUMENTS

| | | |
|---|---|---|
| CN | 106425533 A | 2/2017 |
| CN | 206253889 U | 6/2017 |
| JP | H01-175135 U | 12/1989 |
| JP | 2007-331078 A | 12/2007 |
| JP | 2009-279753 A | 12/2009 |
| JP | 2010-125552 A | 6/2010 |
| JP | 5072269 B2 | 11/2012 |
| JP | 5887299 B2 | 3/2016 |

OTHER PUBLICATIONS

An Office Action mailed by the State Intellectual Property Office of the People's Republic of China dated Nov. 5, 2019, which corresponds to Chinese Patent Application No. 201811027431.1 and is related to U.S. Appl. No. 16/110,468.

\* cited by examiner

ROTARY TABLE SYSTEM

This application is based on and claims the benefit of priority from Japanese Patent Application No. 2017-170967, filed on 6 Sep. 2017, the content of which is incorporated herein by reference.

BACKGROUND OF THE INVENTION

Field of the Invention

The present invention relates to a rotary table system. More specifically, the present invention relates to a rotary table system that has a cantilever rotary table in which a rotary table is coupled to either end of a member for loading a workpiece.

Related Art

Rotary tables are often used in machine tools. One machining method that uses a rotary table is a method of machining a workpiece after indexing the workpiece to a predetermined angle. Another such method is a method of machining while changing the angle of the workpiece (synchronous machining). When machining after indexing the workpiece to a predetermined angle as in the first method, an indexing position must be held even under large machining load. Because of this, the rotary table includes a clamping mechanism so that it can perform either an operation of holding the indexing position (clamping operation) or an operation of allowing rotation (unclamping operation).

The clamping mechanism frequently repeats the clamping operation and the unclamping operation while machining a workpiece, and such continuous use causes gradual wear and tear to occur. This sometimes leaves the clamping mechanism unable to exert the clamp torque necessary to hold the rotary table in a stopped state. in light of this, there has been proposed a technology of using a clamp torque measuring device to periodically measure the clamp torque of the clamping mechanism and thereby detect a reduction in clamp torque early (see, for example, Patent Literature 1).

However, two types of rotary tables exist. More specifically, there is a uniform type that supports only one end of a fixture or workpiece, and a cantilever type that supports both ends of a member for loading a workpiece with separate rotary tables. A cantilever rotary table is often used if the workpiece to be machined is large or heavy. In particular, when it is estimated that a large load will be applied, a rotary table that has a clamping mechanism for each rotary table on either end of the member for loading a workpiece is used. This type of cantilever rotary table that has a clamping mechanism for each rotary table is able to synchronously perform clamping and unclamping operations for two rotary tables in order to hold the indexing position under machining load.

Patent Document 1: Japanese Patent No. 5887299

SUMMARY OF THE INVENTION

However, using a cantilever rotary table is problematic when clamp torque is measured using the above-described clamp torque measuring device. More specifically, because the two rotary tables synchronously perform the clamping operation and the unclamping operation, only the combined clamp torque of the two rotary tables (clamp torque of the system as a whole) can be measured when clamp torque is measured using the clamp torque measuring device. Therefore, there is a problem in that, if the clamping mechanism of one of the rotary tables among the two rotary tables suffers a reduction in clamp torque, the clamping mechanism of that rotary table cannot be identified.

On the other hand, if the clamp torque of each clamping mechanism is to be measured separately after the member for loading a workpiece is removed and the two rotary tables are separated, the clamping mechanism that has suffered a reduction in clamp torque can be identified. However, a measuring task in this case requires many man hours to separate the rotary tables and is very complicated. Furthermore, rotary torque must be applied to the rotary tables when clamp torque is measured. Therefore, if one of the two rotary tables is a support table that does not have a drive source such as a motor, the clamp torque of that rotary table cannot be measured after the rotary table is separated from the other rotary table that has a drive source.

Therefore, it is an object of the present invention to provide a rotary table system that can easily and separately measure clamp torque of each of clamping mechanisms without needing to separate cantilever rotary tables.

(1) A rotary table system according to the present invention is a rotary table system (for example, a rotary table system 10 to be described later) including a member for loading a workpiece (for example, a member for loading a workpiece 101 to be described later) on which a workpiece is loaded; a first rotary table (for example, a main table 1A to be described later) coupled to one end side of the member for loading a workpiece; a second rotary table (for example, a support table 1B to be described later) coupled to an other end side of the member for loading a workpiece; a motor (for example, a motor 4 to be described later) provided so as to rotatably drive the first rotary table and/or the second rotary table and configured to rotatably drive the member for loading a workpiece; a first clamping mechanism (for example, a first clamping mechanism 5A to be described later) provided in the first rotary table and configured to hold the first rotary table at a stopped position; a second clamping mechanism (for example, a second clamping mechanism 5B to be described later) provided in the second rotary table and configured to hold the second rotary table at a stopped position; and a clamp torque measuring device (for example, a clamp torque measuring device 300 to be described later) that causes the motor to generate rotary torque under a state in which the first rotary table or the second rotary table is held in a stopped position, to thereby measure clamp torque on the basis of a change in state of a rotational axis of the motor at that time and torque information on the motor, the rotary table system including: a first operating passage (for example, a branched flow passage 401 to be described later) that sends an instruction for a clamping operation to the first clamping mechanism; and a second operating passage (for example, a branched flow passage 402 to be described later) that sends an instruction for a clamping operation to the second clamping mechanism, in which the clamp torque measuring device measures the clamp torque individually for each of the first clamping mechanism and the second clamping mechanism by individually selecting the first operating passage and the second operating passage to cause the first clamping mechanism and the second clamping mechanism to individually perform a clamping operation.

(2) In the rotary table system according to (1), the first operating passage and the second operating passage may each be a pneumatic flow passage or a hydraulic flow passage; the first operating passage may include a first valve (for example, a first switchover valve 411 to be described later) that can supply pneumatic pressure or hydraulic pressure to the first clamping mechanism such that the first clamping mechanism performs a clamping operation; the second operating passage may include a second valve (for example, a second switchover valve 412 to be described later) that can supply pneumatic pressure or hydraulic pressure to the second clamping mechanism such that the second clamping mechanism performs the clamping operation; and the clamp torque measuring device may measure the clamp torque individually for each of the first clamping mechanism and the second clamping mechanism by individually operating the first valve and the second valve to cause the first clamping mechanism and the second clamping mechanism to individually perform the clamping operation.

According to the present invention, there can be provided a rotary table system that can easily and separately measure clamp torque of each of clamping mechanisms without needing to separate cantilever rotary tables.

DETAILED DESCRIPTION OF THE INVENTION

Figure 1:
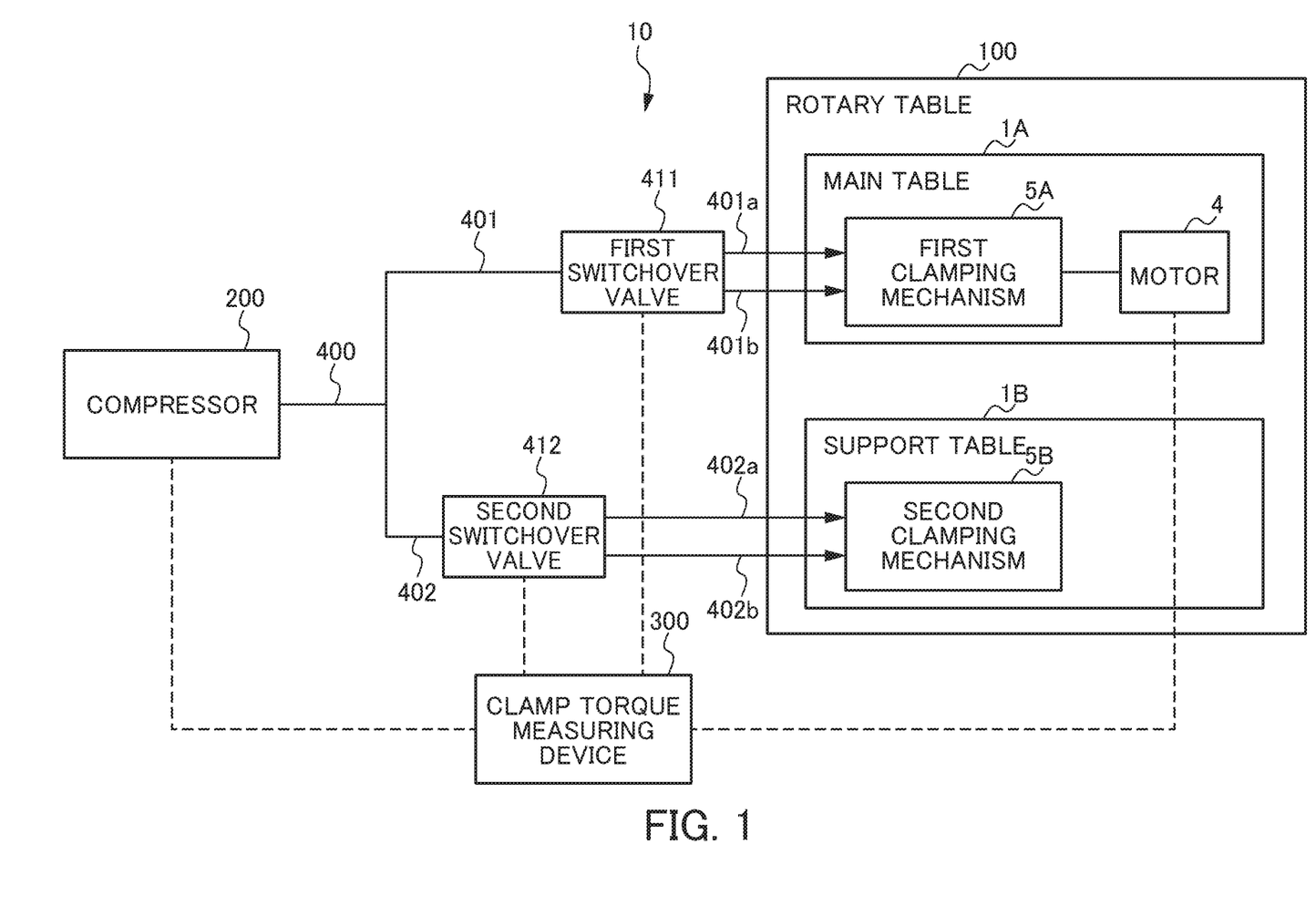
FIG. 1 is a block diagram for illustrating an outline of a rotary table system according to the present invention.
Figure 2:
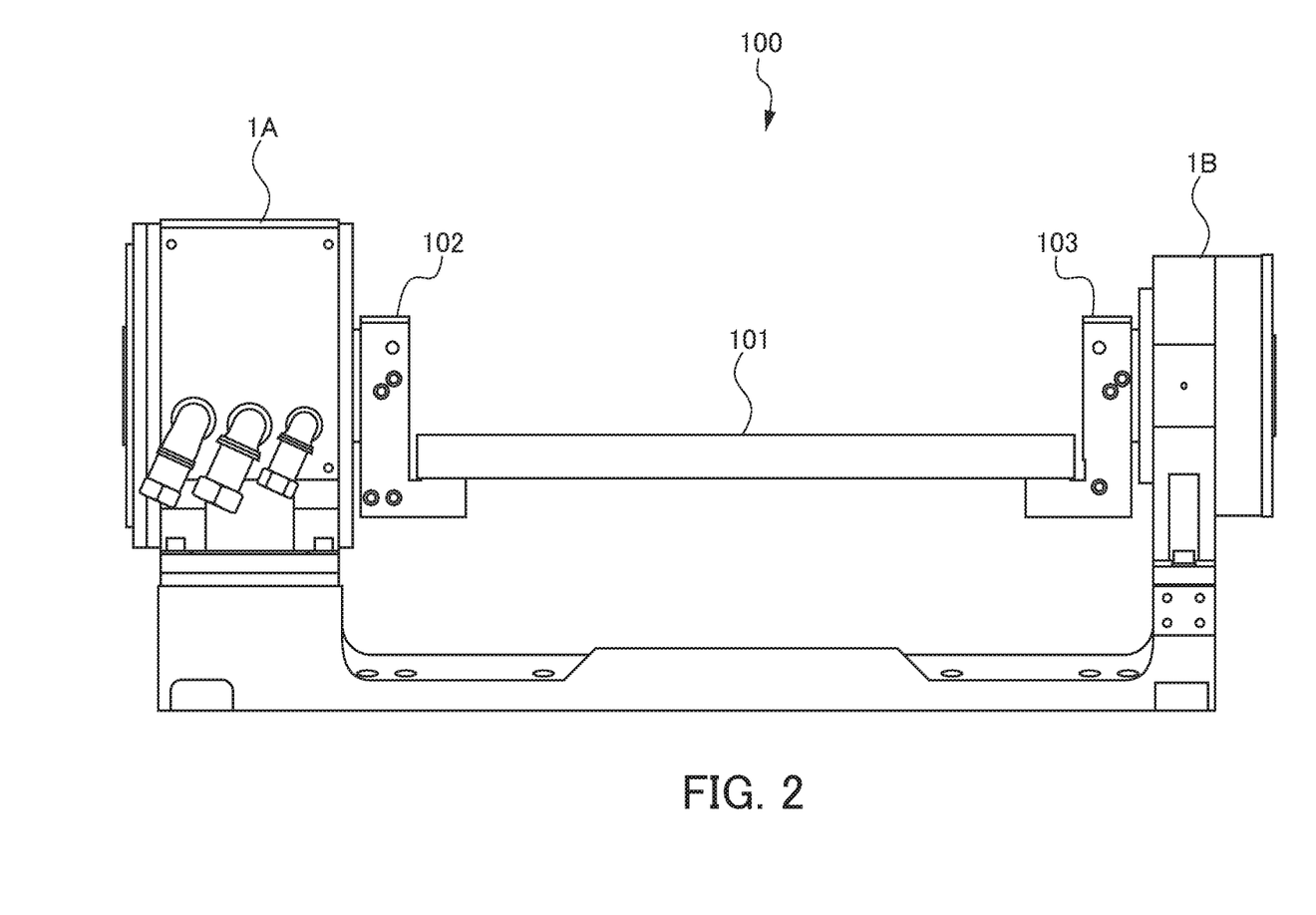
FIG. 2 is a front view for illustrating a cantilever rotary table used in the rotary table system according to the present invention.

An embodiment of the present invention is described below with reference to the figures. FIG. 1 is a block diagram for illustrating an outline of a rotary table system according to the present invention. FIG. 2 is a front view for illustrating a cantilever rotary table used in the rotary table system according to the present invention. As illustrated in FIG. 1, a rotary table system 10 includes a cantilever rotary table 100, a compressor 200 that generates compressed air to be used as working fluid, a clamp torque measuring device 300 that measures clamp torque of a clamping mechanism, an air supply flow passage 400, a first switchover valve 411 and a second switchover valve 412. The first switchover valve 411 corresponds to a "first valve" in the present invention and the second switchover valve 412 corresponds to a "second valve" in the present invention.

As illustrated in FIG. 2, the cantilever rotary table 100 includes a main table 1A, a support table 1B, and a member for loading a workpiece 101. The main table 1A is coupled to one end (left end in FIG. 1) of the member for loading a workpiece 101 via a coupling member 102. The support table 1B is coupled to an other end (right end in FIG. 1) of the member for loading a workpiece 101 via a coupling member 103. Therefore, the main table 1A and the support table 1B are coupled to each other via the member for loading a workpiece 101 and the coupling members 102, 103 so as to rotate integrally. The main table 1A corresponds to a "first rotary table" in the present invention and the support table 1B corresponds to a "second rotary table" in the present invention.

The compressor 200 generates compressed air to be supplied to a first clamping mechanism 5A of the main table 1A and a second clamping mechanism 5B of the support table 1B in the rotary table 100. The compressor 200 is coupled to each of the clamping mechanisms 5A, 5B via the air supply flow passage 400 so as to allow air to be supplied thereto. The air supply flow passage 400 is divided partway down into a branched flow passage 401 that faces the first clamping mechanism 5A of the main table 1A and a branched flow passage 402 that faces the second clamping mechanism 5B of the support table 1B. The first switchover valve 411 is provided in the branched flow passage 401 and the second switchover valve 412 is provided in the branched flow passage 402.

The first switchover valve 411 and the first clamping mechanism 5A are connected to each other via two flow passages that are a clamping flow passage 401a that supplies compressed air used in the clamping operation to the first clamping mechanism 5A and an unclamping flow passage 401b that supplies compressed air used in the unclamping operation to the first clamping mechanism 5A. The first switchover valve 411 operates so as to switch the flow of compressed air supplied from the compressor 200 to either the clamping flow passage 401a or the unclamping flow passage 401b.

The second switchover valve 412 and the second clamping mechanism 5B are connected to each other via two flow passages that are a clamping flow passage 402a that supplies compressed air used in the clamping operation to the second clamping mechanism 5B and an unclamping flow passage 402b that supplies compressed air used in the unclamping operation to the second clamping mechanism 5B. The second switchover valve 412 operates so as to switch the flow of compressed air supplied from the compressor 200 to either the clamping flow passage 402a or the unclamping flow passage 402b.

For example, a three-way valve that is a solenoid valve capable of electronically controlling switchover can be used for each of the first and second switchover valves 411 and 412.

The clamp torque measuring device 300 is connected to the compressor 200 and a motor 4 (described later) of the main table 1A so as to perform control to measure clamp torque of each of the clamping mechanisms 5A, 5B. The clamp torque measuring device 300 is also connected to the first switchover valve 411 and the second switchover valve 412 so as to perform control to separately switch between the first switchover valve 411 and the second switchover valve 412.

Figure 3:
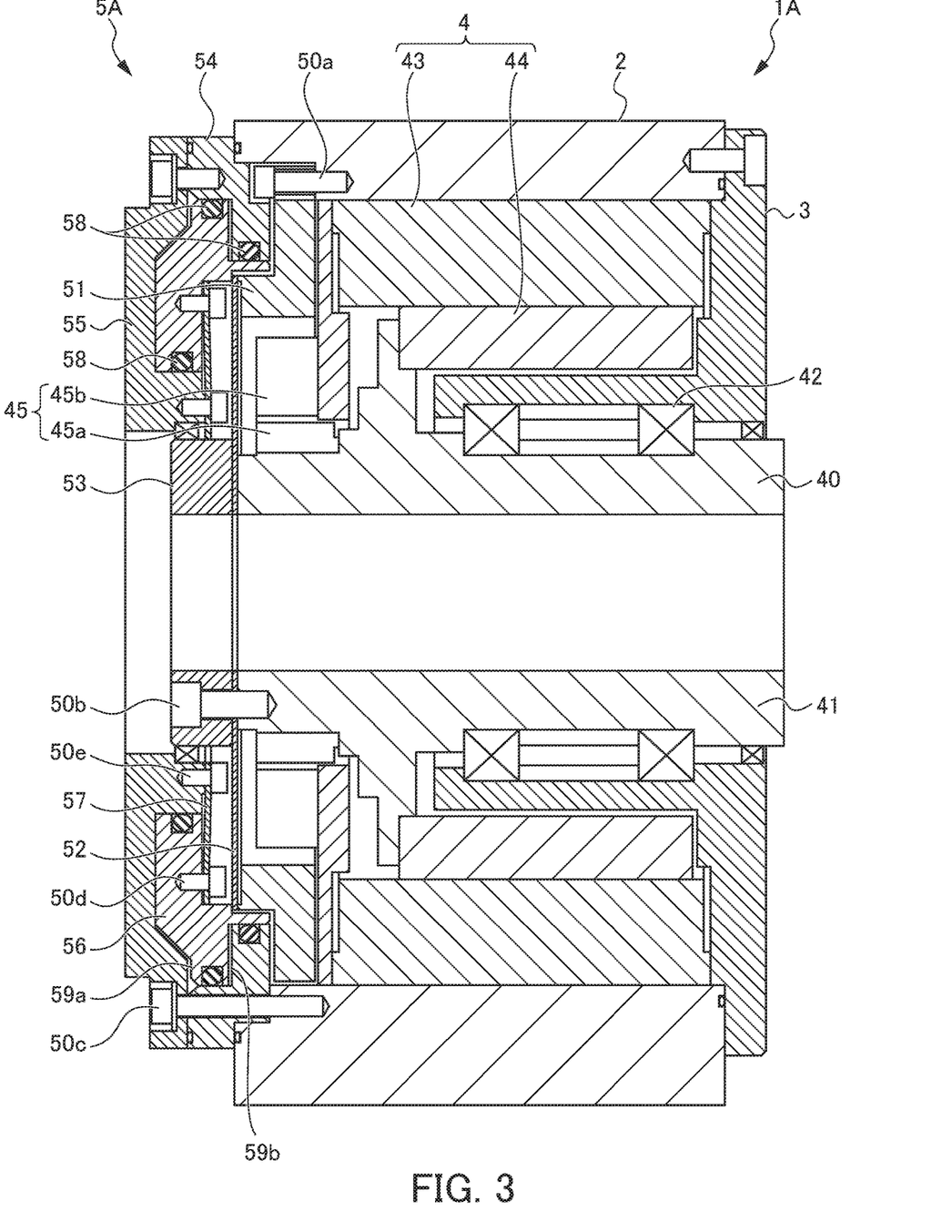
FIG. 3 is a cross-sectional view for illustrating an internal structure of a main table.
Figure 4:
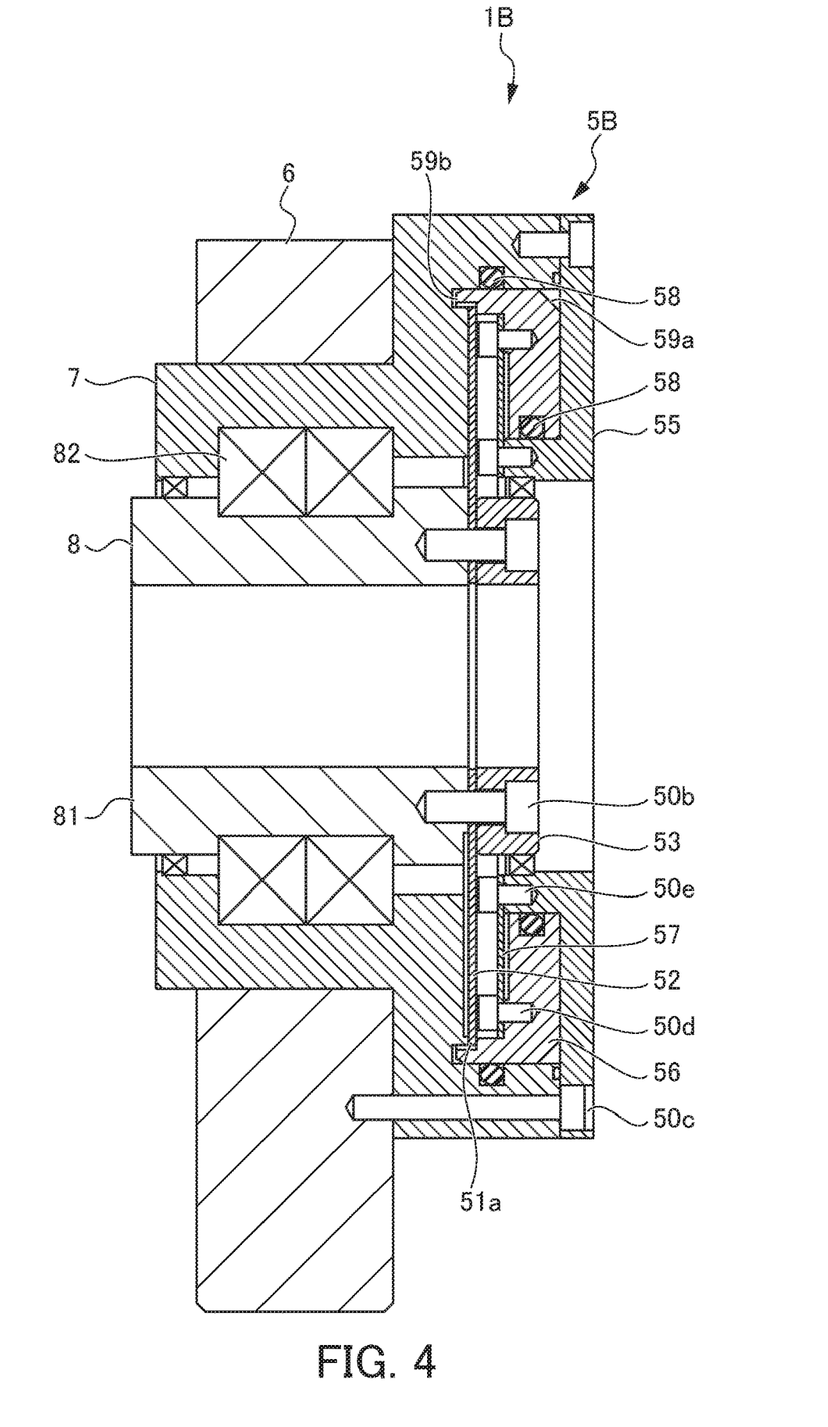
FIG. 4 is a cross-sectional view for illustrating an internal structure of a support table.

Next, configurations of the main table 1A and the support table 1B are described with reference to FIGS. 3 and 4. FIG. 3 is a cross-sectional view for illustrating an internal structure of the main table 1A. FIG. 4 is a cross-sectional view for illustrating an internal structure of the support table 1B.

As illustrated in FIG. 3, the main table 1A includes a housing 3 fixed to a case 2. The housing 3 houses the motor 4 that is a drive source and a shaft 40 that is rotationally driven by the motor 4. As illustrated in FIG. 2, the member for loading a workpiece 101 is mounted to a front end surface 41 (right end surface in FIG. 3) of the shaft 40 by way of the coupling member 102.

The shaft 40 is rotatably supported in the housing 3 using a main bearing 42. A stator 43 of the motor 4 for rotationally driving the shaft 40 is fixed to the housing 3, and a rotor 44 of the motor 4 is fixed to an outer periphery of the shaft 40. The rotor 44 is rotatably supported by the case 2.

The main table 1A includes a position detector 45 that is an encoder than can detect the rotational position/speed of the shaft 40. The position detector 45 is formed of an encoder disc 45a fixed to the shaft 40 and a detector 45b fixed to the housing 3. A detection signal of the detector 45b is input to the clamp torque measuring device 300.

The main table 1A includes the first clamping mechanism 5A. The first clamping mechanism 5A includes a clamp member 51, a brake disc 52, a disc holder 53, a cylinder 54, a rear plate 55, a piston 56 and a disc spring 57.

The clamp member 51 is disposed on a rear end of the case 2 and is non-rotatably fixed to the case 2 via a bolt 50a. The brake disc 52 is fixed by being sandwiched between the disc holder 53 and the shaft 40. The brake disc 52 and the disc holder 53 are non-rotatably fixed to the shaft 40 via a bolt 50b. With this configuration, the brake disc 52 and the disc holder 53 are linked to the shaft 40 and can rotate integrally about the case 2.

The cylinder 54 is non-rotatably attached to the case 2 together with the rear plate 55 via a bolt 50c. The piston 56 is housed in a piston housing chamber formed of the cylinder 54 and the rear plate 55.

The disc spring 57 is a disc-shaped elastic member. The disc spring 57 is fixed to the piston 56 via a bolt 50d and fixed to the rear plate 55 via a bolt 50e. With this configuration, the disc spring 57 prevents the piston 56 from rotating about the shaft 40. The disc spring 57 also biases the piston 56, using repulsive force generated by elastic deformation, toward a direction (clamping direction) in which the brake disc 52 is perpetually sandwiched between the clamp member 51 and the piston 56.

The piston 56 can move back/forth inside the piston housing chamber formed of the cylinder 54 and the rear plate 55 via a plurality of seal members 58. The piston housing chamber is divided with the piston 56 as a boundary into two operation chambers, namely, a clamping chamber 59a and an unclamping chamber 59b. The clamping chamber 59a is disposed opposite to the brake disc 52 sandwiching the piston 56 and communicates with the clamping flow passage 401a of the branched flow passage 401. The unclamping chamber 59b is disposed on the brake disc 52 side sandwiching the piston 56 and communicates with the unclamping flow passage 401b of the branched flow passage 401. Therefore, when compressed air is supplied to the clamping chamber 59a, the piston 56 quickly moves in the sandwiching direction (clamping direction) of the brake disc 52 due to the biasing force of the disc spring 57 and holds a clamped state due to the pressure of the compressed air. When compressed air is supplied to the unclamping chamber 59b, the piston 56 moves in a direction separating from the brake disc 52 (unclamping direction) against the biasing force of the disc spring 57 and holds an unclamped state due to the pressure of the compressed air.

On the other hand, as illustrated in FIG. 4, the support table 1B includes a housing 7 fixed to a case 6. The housing 7 houses a shaft 8 that is a rotation shaft. As illustrated in FIG. 2, the member for loading a workpiece 101 is attached to a front end surface 81 (left end surface in FIG. 4) of the shaft 8 via the coupling member 103. The shaft 8 is rotatably supported inside the housing 7 via a main bearing 82.

The support table 1B does not include a motor as a drive source or a position detector. However, because the shaft 8 of the support table 1B is integrally coupled to the shaft 40 of the main table 1A via the member for loading a workpiece 101, the position of the shaft 8 of the support table 1B can be detected using the position detector 45 provided in the main table 1A that moves in conjunction with the support table 1B via the member for loading a workpiece 101.

The support table 1B also includes the second clamping mechanism 5B having the same configuration as the above-described first clamping mechanism 5A. The second clamping mechanism 5B has substantially the same configuration as the first clamping mechanism 5A except that the clamp member 51 and the cylinder 54 of the first clamping mechanism 5A are also used as the housing 7 of the support table 1B. Therefore, components of the second clamping mechanism 5B other than the clamp member 51 and the cylinder 54 of the first clamping mechanism 5A are denoted by the same reference symbols as the components of the first clamping mechanism 5A.

In other words, the piston housing chamber of the support table 1B is also divided with the piston 56 as a boundary into two operation chambers, namely, the clamping chamber 59a and the unclamping chamber 59b. The clamping chamber 59a of the support table 1B communicates with the clamping flow passage 402a of the branched flow passage 402 and the unclamping chamber 59b communicates with the unclamping flow passage 402b of the branched flow passage 402. Therefore, when compressed air is supplied to the clamping chamber 59a, the piston 56 quickly moves in the sandwiching direction (clamping direction) of the brake disc 52 due to the biasing force of the disc spring 57 and holds a clamped state due to the pressure of the compressed air. When compressed air is supplied to the unclamping chamber 59b, the piston 56 moves in a direction separating from the brake disc 52 (unclamping direction) against the biasing force of the disc spring 57 and holds an unclamped state due to the pressure of the compressed air. A detailed description of other components of the second clamping mechanism 5B is omitted herein and the description of the first clamping mechanism 5A shall be cited instead.

Figure 5:
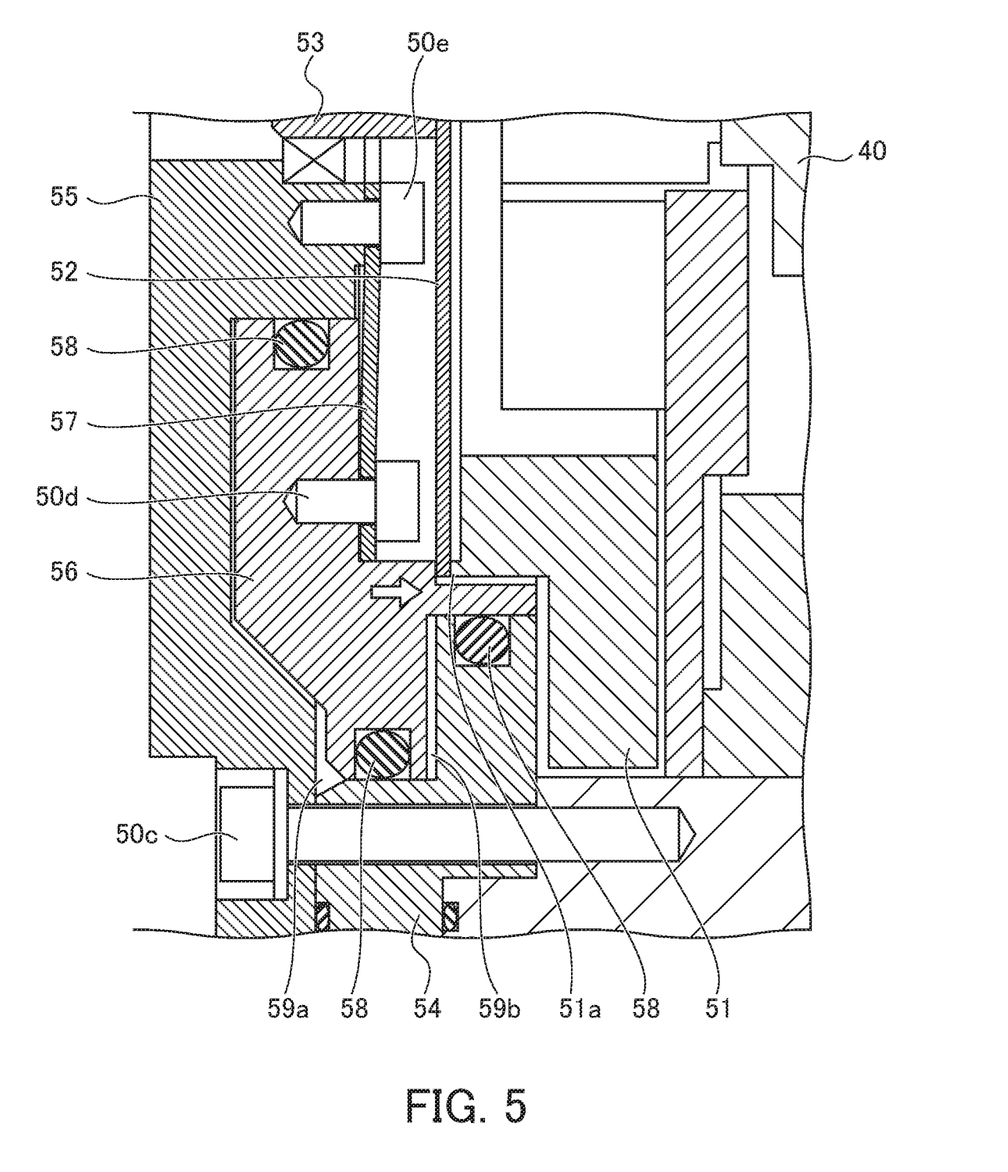
FIG. 5 is a diagram for describing a clamping operation of a clamping mechanism.
Figure 6:
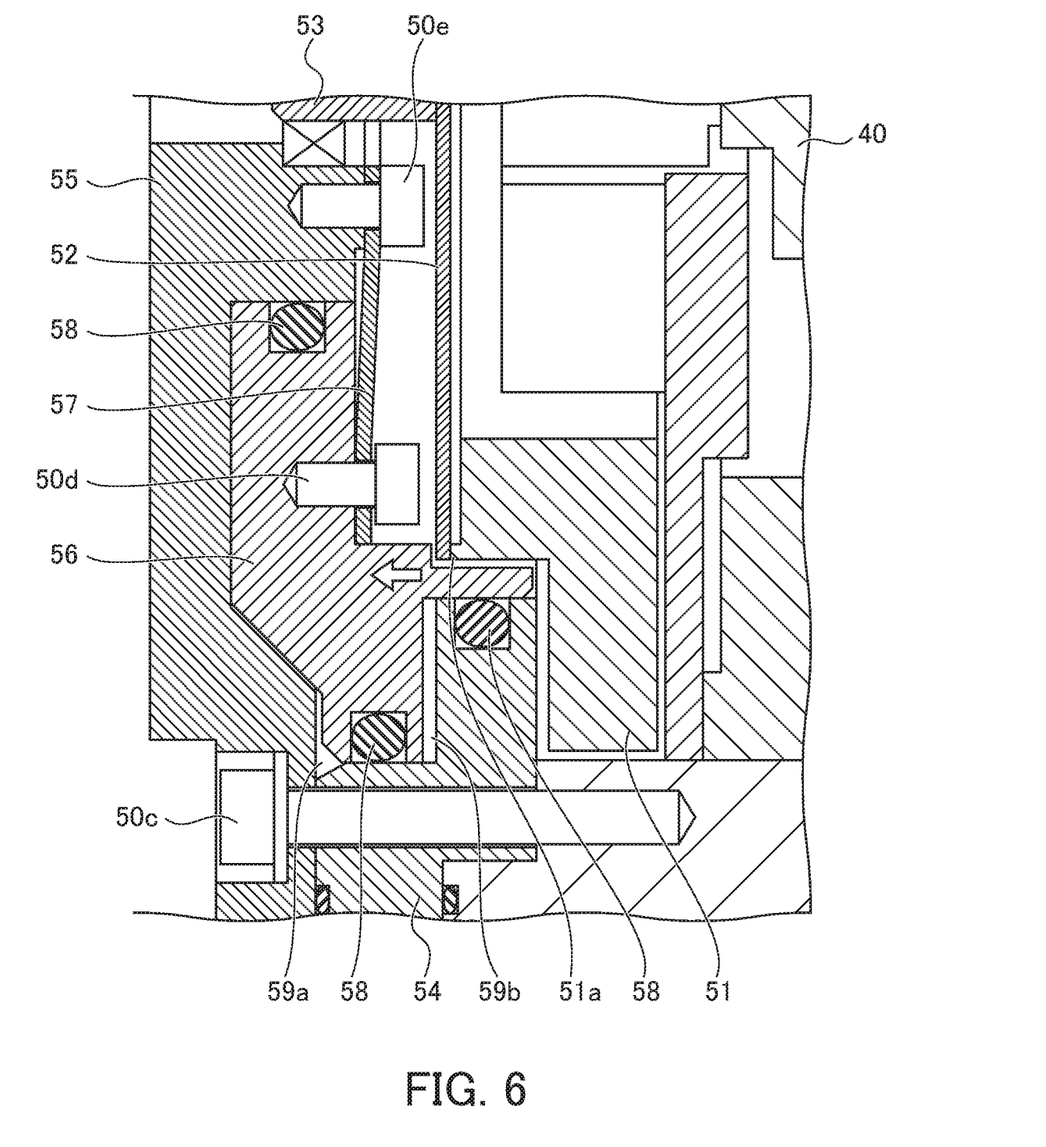
FIG. 6 is a diagram for describing an unclamping operation of the clamping mechanism.
Figure 7:
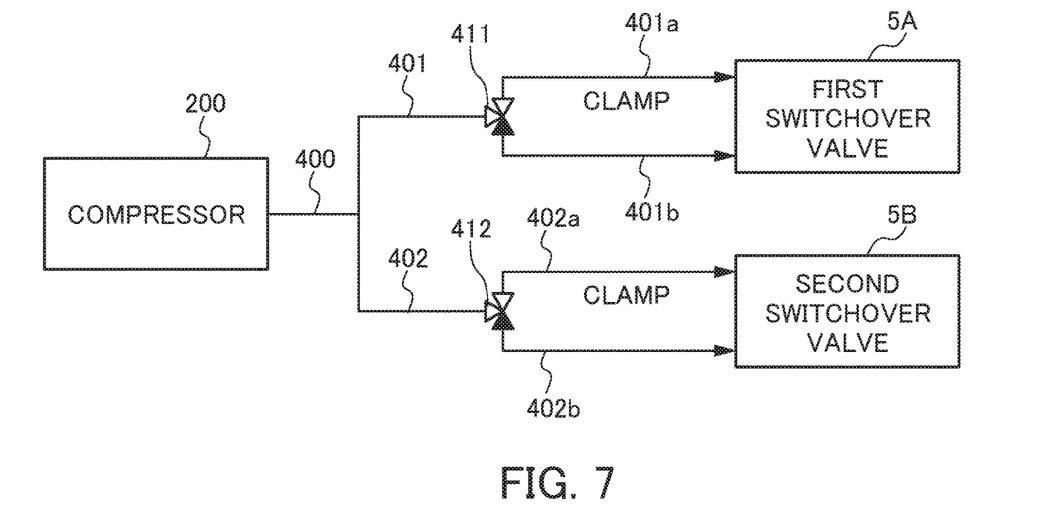
FIG. 7 is a block diagram for describing a state in which clamping operations of a first clamping mechanism and a second clamping mechanism are synchronously performed.
Figure 8:
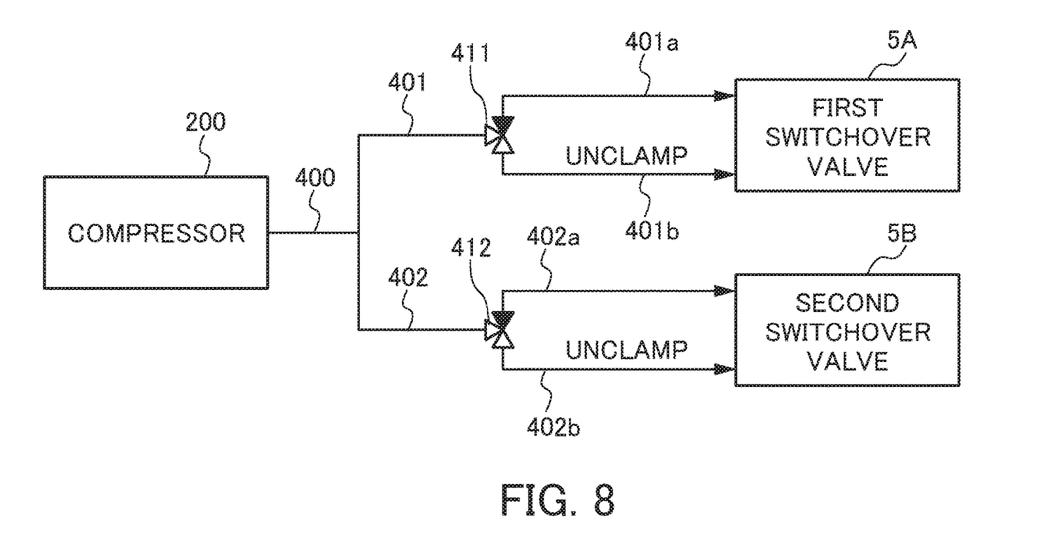
FIG. 8 is a block diagram for describing a state in which unclamping operations of the first clamping mechanism and the second clamping mechanism are synchronously performed.

Next, the clamping/unclamping operation of the first clamping mechanism 5A and the second clamping mechanism 5B when determining an indexing position of a workpiece using the rotary table 100 is described with reference to FIGS. 5 and 6. FIG. 5 is a diagram for describing the clamping operation of the clamping mechanism. FIG. 6 is a diagram for describing the unclamping operation of the clamping mechanism. FIGS. 5 and 6 show the first clamping mechanism 5A. The second clamping mechanism 5B operates in exactly the same way as the first clamping mechanism 5A, and hence the operation of the second clamping mechanism 5B is not shown in the figures. FIG. 7 is a block diagram for describing a state in which the clamping operations of the first clamping mechanism 5A and the second clamping mechanism 5B are synchronously performed. FIG. 8 is a block diagram for describing a state in which the unclamping operations of the first clamping mechanism 5A and the second clamping mechanism 5B are synchronously performed. In the first switchover valve 411 and the second switchover valve 412 shown in FIG. 7, a flow passage indicated by a white arrow refers to a flow passage opened by a switchover valve and a flow passage indicated by a black arrow refers to a flow passage closed by a switchover valve.

As illustrated in FIG. 7, during the clamping operation, the clamping flow passage 401a of the first switchover valve 411 and the clamping flow passage 402a of the second switchover valve 412 are switched over so as to synchronously open. Because of this, compressed air is supplied to the clamping chamber 59a of each clamping mechanism 5A, 5B and not supplied to the unclamping chamber 59b. With this configuration, the piston 56 of each clamping mechanism 5A, 5B moves as indicated by an arrow in FIG. 5 in a direction that makes contact with the brake disc 52 due to the biasing force of the disc spring 57, and is pushed against the brake disc 52 by the pressure of the compressed air supplied to the clamping chamber 59a. As a result, the brake disc 52 of each clamping mechanism 5A, 5B is sandwiched between the piston 56 and a clamping surface 51a of the clamp member 51. With this configuration, the brake disc 52 holds the shaft 40 of the main table 1A and the shaft 8 of the support table 1B in a non-rotatable stopped state and stops the workpiece loaded on the member for loading a workpiece 101 at a predetermined angle.

On the other hand, as illustrated in FIG. 8, during the unclamping operation, the unclamping flow passage 401b of the first switchover valve 411 and the unclamping flow passage 402b of the second switchover valve 412 are switched over so as to synchronously open. Because of this, compressed air is supplied to the unclamping chamber 59b of each clamping mechanism 5A, 5B and not supplied to the clamping chamber 59a. With this configuration, the piston 56 of each clamping mechanism 5A, 5B moves as indicated by an arrow in FIG. 6 in a direction separating from the brake disc 52 against the biasing force of the disc spring 57 due to the pressure of the compressed air supplied to the unclamping chamber 59b. Then, the brake disc 52 of each clamping mechanism 5A, 5B synchronizes and enters an unclamped state. As a result, the shaft 40 of the main table 1A and the shaft 8 of the support table 1B are able to rotate and are synchronously rotated until the workpiece loaded on the member for loading a workpiece 101 reaches a predetermined indexing position.

Figure 9:
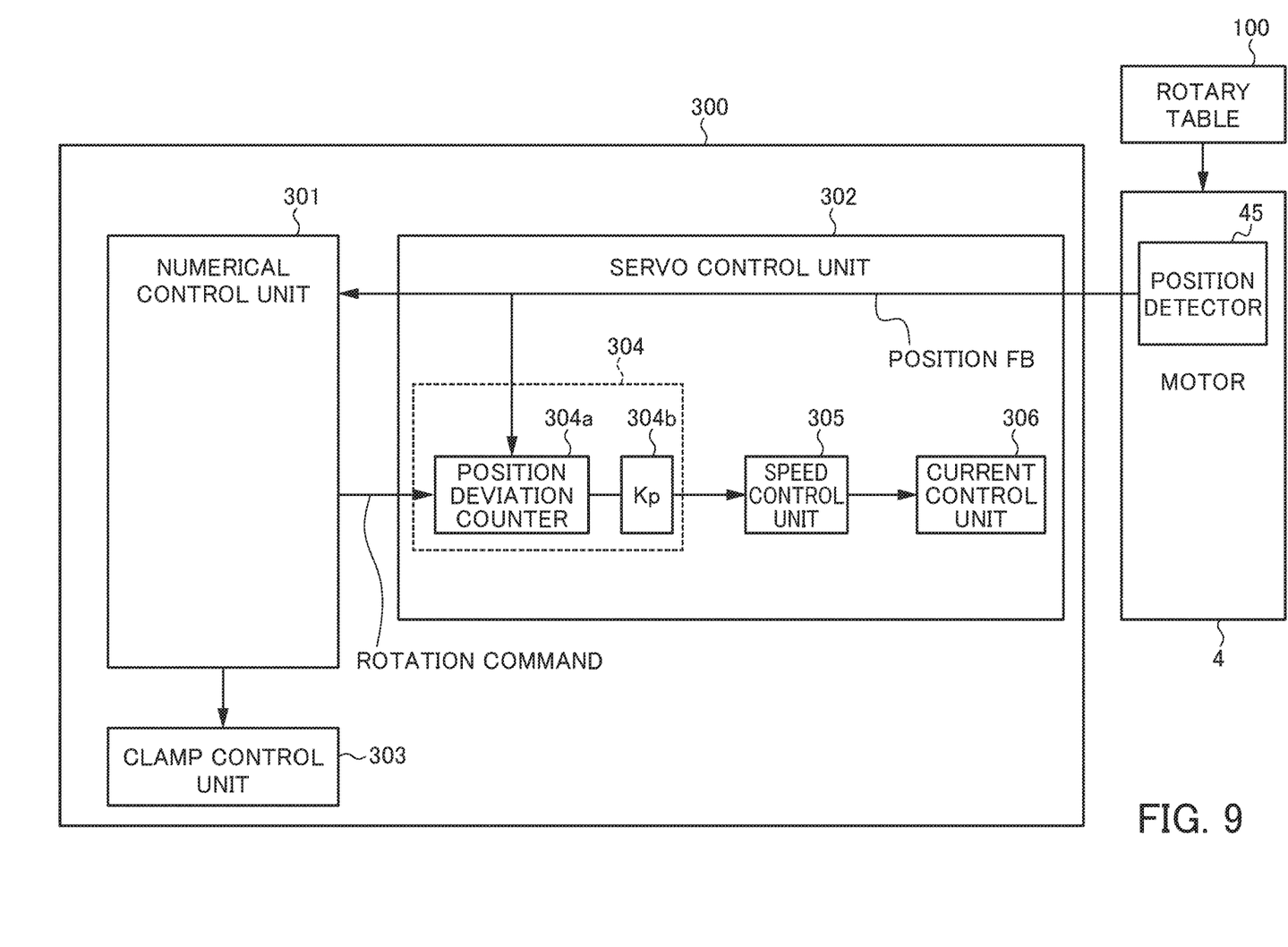
FIG. 9 is a block diagram for illustrating a configuration of a clamp torque measuring device of the rotary table system according to the present invention.

Next, the clamp torque measuring device 300 is described. FIG. 9 is a block diagram for describing an exemplary configuration of the clamp torque measuring device 300. The clamp torque measuring device 300 includes a numerical control unit 301, a servo control unit 302 and a clamp control unit 303. The servo control unit 302 includes a position control unit 304 formed of a position deviation counter 304a and a position loop gain 304b, a speed control unit 305 and a current control unit 306. The position control unit 304 performs control of positioning the member for loading a workpiece 101 of the rotary table 100 based on a position command output from the numerical control unit 301. The components of the clamp torque measuring device 300 may be provided in a controller (not shown) of the rotary table 100.

The numerical control unit 301 outputs a rotation command to the servo control unit 302 and outputs a clamp command or an unclamp command to the clamp control unit 303. The numerical control unit 301 inputs position feedback information (position FB) that a detection signal output from the position detector 45 provided in the motor 4 of the main table 1A.

The numerical control unit 301 sends a command for clamping the shaft 40, 8 to the clamp control unit 303 and gradually sends a rotation command (position command) to the servo control unit 302 while the shaft 40, 8 is fixed so as to not rotate. The clamp control unit 303 controls drive of the compressor 200 and the switching operations of the first switchover valve 411 and the second switchover valve 412 such that the piston 56 of the clamping mechanism 5A or 5B (see FIGS. 3 and 4) performs the clamping operation.

Generally speaking, clamp torque of a clamping mechanism is measured in the following way using the clamp torque measuring device 300. First, with the shaft clamped, a rotation command is sent to the motor and rotary torque is gradually applied. At this time, the rotational position of the shaft does not change because the shaft is clamped. However, at some point, rotary torque generated by the motor exceeds clamp torque and the clamping mechanism slips. When this happens, the rotational position of the shaft shifts from its initial position (clamped and stopped position). The rotational position of the shaft is then detected by the position detector 45 and position FB output by the position detector 45 is input to the numerical control unit 301. The numerical control unit 301 measures the clamp torque by reading torque generated by the motor at the point of change in the rotational position. The clamp torque can be measured using, for example, drive current of the motor.

Figure 10:
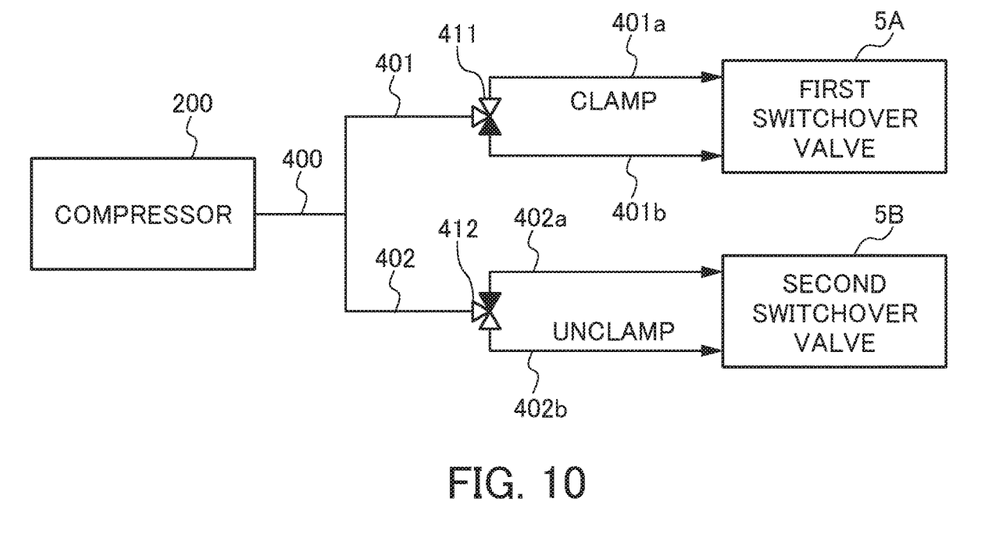
FIG. 10 is a diagram for illustrating a state in which clamp torque is measured by only performing the clamping operation of the first clamping mechanism in the rotary table system according to the present invention.

Now, a method for measuring clamp torque of each of the first clamping mechanism 5A and the second clamping mechanism 5B according to this embodiment is described with reference to FIGS. 10 and 11. In the first switchover valve 411 and the second switchover valve 412 illustrated in FIGS. 10 and 11, a flow passage indicated by a white arrow refers to a flow passage opened by a switchover valve and a flow passage indicated by a black arrow refers to a flow passage closed by a switchover valve. First, as illustrated in FIG. 10, when clamp torque of the first clamping mechanism 5A of the main table 1A is to be measured, the first switchover valve 411 of the branched flow passage 401 is controlled to switch over such that the clamping flow passage 401a opens, and the second switchover valve 412 of the branched flow passage 402 is controlled to switch over such that the unclamping flow passage 402b opens. Because of this, compressed air is supplied from the compressor 200 to the clamping chamber 59a of the first clamping mechanism 5A of the main table 1A and the unclamping chamber 59b of the second clamping mechanism 5B of the support table 1B. Therefore, the piston 56 of the first clamping mechanism 5A clamps the brake disc 52 due to the compressed air supplied to the clamping chamber 59a and holds the shaft 40 of the main table 1A in a non-rotatable stopped state. On the other hand, the piston 56 of the second clamping mechanism 5B separates from the brake disc 52 against the biasing force of the disc spring 57 due to the compressed air supplied to the unclamping chamber 59b and places the shaft 8 of the support table 1B in a rotatable state.

Under this state, as described above, a rotation command is output from the clamp torque measuring device 300 to the motor 4 of the main table 1A. Due to this, the motor 4 of the main table 1A rotates and clamp torque of the first clamping mechanism 5A of the main table 1A is measured. At this time, because the second clamping mechanism 5B of the support table 1B is in an unclamped state and shaft 8 is in a rotatable state, only the clamp torque of the first clamping mechanism 5A is measured.

Figure 11:
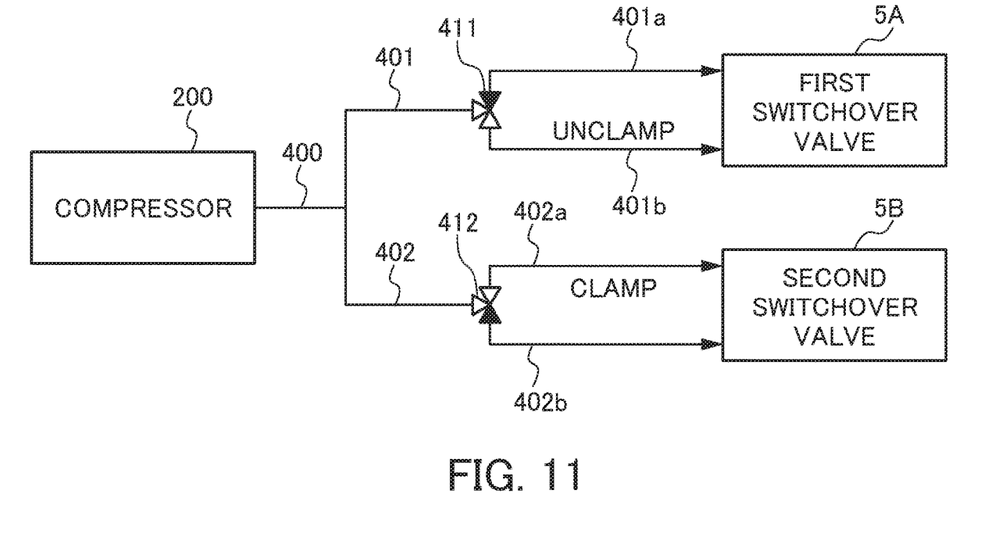
FIG. 11 is a diagram for illustrating a state in which clamp torque is measured by only performing the clamping operation of the second clamping mechanism in the rotary table system according to the present invention.

Next, as illustrated in FIG. 11, when clamp torque of the second clamping mechanism 5B of the support table 1B is to be measured, the first switchover valve 411 of the branched flow passage 401 is controlled to switch over such that the unclamping flow passage 401b opens, and the second switchover valve 412 of the branched flow passage 402 is controlled to switch over such that the clamping flow passage 402a opens. Because of this, compressed air is supplied from the compressor 200 to the unclamping chamber 59b of the first clamping mechanism 5A of the main table 1A and the clamping chamber 59a of the second clamping mechanism 5B of the support table 1B. Therefore, the piston 56 of the first clamping mechanism 5A separates from the brake disc 52 against the biasing force of the disc spring 57 due to the compressed air supplied to the unclamping chamber 59b and places the shaft 40 of the main table 1A in a rotatable state. On the other hand, the piston 56 of the second clamping mechanism 5B clamps the brake disc 52 due to the compressed air supplied to the clamping chamber 59a and holds the shaft 14 of the support table 1B in a non-rotatable stopped state.

As described above, under this state, a rotation command is output from the clamp torque measuring device 300 to the motor 4 of the main table 1A. Due to this, the motor 4 of the main table 1A rotates and rotary torque of the motor 4 is transmitted to the shaft 8 of the support table 1B via the member for loading a workpiece 101. As a result, the shaft 8 of the support table 1B rotates and clamp torque of the second clamping mechanism 5B is measured. At this time, because the first clamping mechanism 5A of the main table 1A is in an unclamped state and the shaft 40 is in a rotatable state, only clamp torque of the second clamping mechanism 5B is measured.

As described above, the rotary table system 10 according to this embodiment includes the first switchover valve 411 for the branched flow passage 401 that supplies compressed air to the first clamping mechanism 5A of the main table 1A, and the second switchover valve 412 for the branched flow passage 402 that supplies compressed air to the second clamping mechanism 5B of the support table 1B. With this configuration, the rotary table system 10 can separately select the switchover operation of the first switchover valve 411 and the second switchover valve 412 to separately operate the clamping operation and the unclamping operation of the first clamping mechanism 5A and the second clamping mechanism 5B. Therefore, the rotary table system 10 can easily and separately measure clamp torque of each of the clamping mechanisms 5A and 5B without needing to separate each table 1A, 1B of the cantilever rotary table 100. In addition, the clamp torque of the second clamping mechanism 5B of the support table 1B can be measured, even if the support table 1B does not have a drive source through the rotary table system 10, using the rotary torque of the motor 4 of the main table 1A.

In the above-described embodiment, the first switchover valve 411 and the second switchover valve 412 are described using a three-way valve as an example, but the first switchover valve 411 and the second switchover valve 412 are not limited thereto. For example, the clamping flow passage 401a, 402a and the unclamping flow passage 401b, 402b may each be provided with an ON/OFF valve (two-way valve) to perform control such that an ON/OFF valve for clamping opens and an ON/OFF valve for unclamping closes during the clamping operation.

The piston 56 of each clamping mechanism 5A, 5B in the above-described embodiment is described as being configured to be biased toward a direction in which the brake disc 52 is perpetually clamped due to elastic repulsive force of the disc spring 57, but the present invention is not limited thereto. One or both of the pistons 56 of the clamping mechanisms 5A, 5B may be configured to be biased toward a direction in which the brake disc 52 is perpetually unclamped due to the elastic repulsive force of the disc spring 57.

The clamping mechanism configured such that the piston 56 is biased by the disc spring 57 toward a direction in which brake disc 52 is perpetually unclamped may be configured such that supply of compressed air to the clamping chamber 59a is shut off during the unclamping operation. By shutting off supply of the compressed air to the clamping chamber 59a, the piston 56 moves in a direction separating from the brake disc 52 due to the biasing force of the disc spring 57, and hence compressed air does not always need to be supplied to the unclamping chamber 59b. Therefore, there is no need to provide the unclamping flow passages 401b, 402b, and the configuration of the rotary table system can be simplified. in this case, ON/OFF valves that simply open/close a flow passage can be used in place of the first switchover valve 411 and the second switchover valve 412.

In the above-described embodiment, there is described a configuration in which one compressor 200 supplies compressed air to the main table 1A and the support table 1B via the branched flow passages 401, 402, but the present invention is not limited thereto. There may be adopted a configuration in which a compressor 200 as a drive source of each of the clamping mechanisms 5A, 5B is provided to correspond to each of the main table 1A and the support table 1B such that air can be supplied thereto via independent air supply flow passages.

In the above-described embodiment, a case using compressed air generated by the compressor 200 is described as an example of operation fluid for operating each of the clamping mechanisms 5A, 5B, but hydraulic pressure can be used as the operating fluid. Alternatively, each clamping mechanism 5A, 5B may be electronically clamped/unclamped. In such a case, electronic signals are used in place of operating fluid, electric wiring is used as an operating passage, and a relay, an open/close switch, or a similar device that turns electronic signals ON/OFF is used as the switchover valve.

Further, clamp torque may be measured by detecting rotational speed of the shaft 40, 8 instead of the rotational position of the shaft 40, 8.

In the above-described embodiment, there is described an exemplary case in which only the main table 1A includes the motor 4 as the drive source, but the present invention is not limited thereto. In the present invention, each rotary table disposed on either end of the member for loading a workpiece may be provided with a motor as a drive source. In this case, when measuring clamp torque, a rotation command may be sent to the motor of the rotary table to be measured.

The rotary table used in the rotary table system according to the present invention is not limited to the above-described rotary table having a direct drive mechanism that directly rotatably drives a shaft, and may also be applied to, for example, a rotary table having a different drive mechanism (worm gear structure, etc.).

EXPLANATION OF REFERENCE NUMERALS 1A first rotary table
1B second rotary table
4 motor
5A first clamping mechanism 5B second clamping mechanism
10 rotary table system
101 member for loading a workpiece
300 clamp torque measuring device
400 air supply flow passage
401 branched flow passage (first operating passage)
402 branched flow passage (second operating passage)
411 first switchover valve (first valve)
412 second switchover valve (second valve)

What is claimed is:

1. A rotary table system including a member for loading a workpiece on which a workpiece is loaded;
   a first rotary table coupled to one end side of the member for loading a workpiece;
   a second rotary table coupled to an other end side of the member for loading a workpiece;
   a single motor provided so as to rotatably drive both the first rotary table and the second rotary table and configured to rotatably drive the member for loading a workpiece;
   a first clamping mechanism provided in the first rotary table and configured to hold the first rotary table at a first stopped position;
   a second clamping mechanism provided in the second rotary table and configured to hold the second rotary table at a second stopped position; and
   and a clamp torque measuring device that causes the motor to generate rotary torque under a state in which the first rotary table or the second rotary table is held in the first stopped position or the second stopped position, respectively, to thereby measure clamp torque on the basis of a change in state of a rotational axis of the motor at that time and torque information on the motor, the rotary table system comprising:
   a first operating passage that sends an instruction for a respective clamping operation to the first clamping mechanism; and
   a second operating passage that sends an instruction for a respective clamping operation to the second clamping mechanism,
   wherein the clamp torque measuring device measures the clamp torque individually for each of the first clamping mechanism and the second clamping mechanism by individually selecting the first operating passage and the second operating passage to cause the first clamping mechanism and the second clamping mechanism to individually perform a clamping operation.

2. The rotary table system according to claim 1, wherein:
   the first operating passage and the second operating passage are each a pneumatic flow passage or a hydraulic flow passage;
   the first operating passage includes a first valve that can supply pneumatic pressure or hydraulic pressure to the first clamping mechanism such that the first clamping mechanism performs a clamping operation;
   the second operating passage includes a second valve that can supply pneumatic pressure or hydraulic pressure to the second clamping mechanism such that the second clamping mechanism performs the clamping operation; and
   the clamp torque measuring device measures the clamp torque individually for each of the first clamping mechanism and the second clamping mechanism by further individually operating the first valve and the second valve to cause the first clamping mechanism and the second clamping mechanism to individually perform the clamping operation.

3. The rotary table system according to claim 1, wherein the clamp torque measuring device measures clamp torque of the first clamping mechanism while the first clamping mechanism is in a clamped position relative to the first rotary table and the second clamping mechanism is in an unclamped position relative to the second rotary table.

4. The rotary table system according to claim 1, wherein the clamp torque measuring device measures clamp torque of the second clamping mechanism while the second clamping mechanism is in a clamped position relative to the second rotary table and the first clamping mechanism is in an unclamped position relative to the first rotary table.

* * * * *